United States Patent [19]

Kaniecki et al.

[11] Patent Number: 5,374,358
[45] Date of Patent: Dec. 20, 1994

[54] SYSTEM FOR TREATING COMMERCIAL WASTE EFFLUENTS

[75] Inventors: Thaddeus J. Kaniecki, Pompton Plains; Harold Diamond, Fort Lee; Larry Rotter, Andover; Rudolph N. Vermes, Randolph, all of N.J.

[73] Assignee: Diamond Chemical Company, Inc., Lyndhurst, N.J.

[21] Appl. No.: 976,816

[22] Filed: Nov. 16, 1992

Related U.S. Application Data

[63] Continuation-in-part of Ser. No. 718,731, Jun. 21, 1991, Pat. No. 5,167,829.

[51] Int. Cl.$^5$ ............................................. C02F 1/52
[52] U.S. Cl. ........................................ 210/704; 210/708; 210/725; 210/728; 210/752; 210/199; 210/202; 210/221.2
[58] Field of Search ............... 210/704, 708, 724, 725, 210/726, 727, 728, 752, 802, 804, 806, 749, DIG. 5, 199, 202, 205, 221.2, 259, 307, 201, 920

[56] References Cited

U.S. PATENT DOCUMENTS

| | | | |
|---|---|---|---|
| 3,080,315 | 3/1963 | Silvey | 210/752 |
| 3,577,341 | 5/1971 | Keith, Jr. et al. | 210/726 |
| 3,707,464 | 12/1972 | Burns et al. | 210/724 |
| 3,883,429 | 5/1975 | Hanford | 210/202 |
| 3,951,795 | 4/1976 | Doncer et al. | 210/201 |
| 4,073,722 | 2/1978 | Grutsch et al. | 210/624 |
| 4,179,369 | 12/1979 | Bradley et al. | 210/708 |
| 4,198,294 | 4/1980 | Deane | 210/704 |
| 4,277,347 | 7/1981 | Pielkenrood | 210/704 |
| 4,278,545 | 7/1981 | Batutis et al. | 210/DIG. 5 |
| 4,698,163 | 10/1987 | Zibrida | 210/726 |
| 4,722,800 | 2/1988 | Aymong | 210/DIG. 5 |
| 4,790,943 | 12/1988 | Dunn et al. | 210/708 |

FOREIGN PATENT DOCUMENTS

53-9050  1/1978  Japan.

*Primary Examiner*—Christopher Upton
*Attorney, Agent, or Firm*—Salzman & Levy

[57] ABSTRACT

The invention pertains to the purification of commercial, industrial and institutional waste streams in order to bring them into dischargeable compliance with environmental standards. The invention provides a system for removing contaminants, such as fats, oils and grease (FOGs) and total petroleum hydrocarbons (TPHs), from waste effluents on an essentially continuous basis. During the treatment process, the FOGs and TPHs disposed within the textiles to be cleaned are treated with an alkaline, pH- or acid-sensitive detergent, causing their emulsification. The effluent waste stream is then treated by removing the solids and particulates. The alkaline emulsion is broken up by acidification of the wastewater, thereby releasing and dispersing the FOGs and TPHs. The FOGs and TPHs in the broken-up and dissolved emulsion are agglomerated by the introduction of an organic, cationic polymer. The waste stream is then fed to a separation station, where the oils are adsorbed on an appropriate surface, such as a plate or lipophilic media pack. The oil molecules form droplets that rise to the surface and are siphoned off and/or pumped away. The wastewater is then dischargeable to the Public Owned Treatment Works (POTW) after a final pH adjustment that conforms the waste effluent to environmental regulation standards.

28 Claims, 2 Drawing Sheets

SYSTEM FOR TREATING COMMERCIAL WASTE EFFLUENTS

RELATED PATENT APPLICATION

This application is a continuation-in-part of copending U.S. patent application Ser. No. 07/718,731 filed Jun. 21, 1971, now U.S. Pat. No. 5,167,829, issued Dec. 1, 1992.

Field of the Invention

The invention pertains to a system for treating or otherwise purifying wastewater effluents so that they can be discharged to a sewer, and, more particularly, an effluent waste stream treatment system for removing fats, oils, greases (FOGs), solids, particulates, heavy metals and other contaminants from commercial and industrial effluents, as well as reducing total petroleum hydrocarbons (TPHs) in solution, in order to render the waste effluent environmentally acceptable.

BACKGROUND OF THE INVENTION

Recently, the United States Environmental Protection Agency has instituted stringent requirements for discharging or otherwise disposing of wastes into the environment. Therefore, commercial effluents (such as laundry wastewater) contain a variety of contaminants which can no longer be discharged into public sewers or fed into sewage treatment facilities.

State and local environmental protection agencies have adopted the federal standards and, in many cases, have even exceeded them in stringency. Therefore, it has become necessary for local industries to purify their wastewater or incur heavy fines and operating restrictions.

Among the industries most subject to the new regulations are commercial laundries, whose waste effluents are particularly afoul with contaminants such as fats, oils, greases, heavy metals, dirt, particulates, solids, etc. Laundry effluents inherently accumulate and concentrate these contaminants. Laundry wastewater is, in particular, closely monitored and regulated by environmental authorities.

In the past, commercial, industrial and institutional cleaning establishments removed oils and greases from textiles by applying detergents thereto. The wastewater was then discharged to the sewer or, in extreme cases, when necessary, treated.

No longer are those procedures for laundering textiles and discharging laundry wastewater effluents adequate. The extremely high standards presently imposed for allowable contaminants in discharged wastewater, cannot usually be met when utilizing the conventional, aforesaid techniques.

In addition, one of the major drawbacks of the prior method of processing the effluent is that it was essentially a batch process. This process is very slow, with the effluent remaining for an extended period of time in large holding tanks so that the FOGs could rise out of solution, before the skimming could be performed. Various mechanical and chemical means were utilized to froth or foam the emulsified contaminants in the wastewater, in order to assist their rise to the surface in the tank. More often than not, the foaming and frothing additives were themselves undesirable contaminants that leached into and polluted the dischargeable wastewater.

In sum, the previous procedure was generally costly and inefficient.

Given more recent regulations, the discharge effluents are now required to be relatively free of total petroleum hydrocarbons (TPHs), as well as the FOGs. This new requirement places an even greater demand on the ability of purification systems to separate the polluting substances from the waste effluent.

While particularly applicable to laundry waste effluent purification, the present invention can be applied to almost any type of industrial wastewater management problem.

The current invention can be used to treat waste effluents in car washes, truck wash facilities, oil dealer establishments, airplane washing operations and garages, as well as in commercial, industrial and institutional laundries.

The process of this invention is not heavily dependent upon time and/or gravity to separate the emulsion, as was necessary in the aforementioned prior art procedure. Rather, this invention chemically breaks down the emulsion so as to release the FOGs from the water phase. The effluent is acidified in order to cause dissolution of the alkaline emulsion and release of the FOGs from the water. To this acidified effluent is added an organic, cationic polymer, which acts as an agglomerating and/or coagulating agent. The acidified effluent is then fed through a coalescer, where the agglomerated FOGs are adsorbed upon an appropriate surface, e.g., a plate of lipophilic material, such as a polyvinylchloride or polypropylene media pack. The agglomerated oil molecules rapidly coalesce and gather upon this surface, forming droplets. The oil droplets quickly rise to the top of the effluent stream where they are siphoned off and/or pumped away. The addition of the organic, cationic polymer prior to the coalescing provides an agglomeration and/or a coagulation of FOGs in solution. This enhances and makes the coalescing procedure more efficient. Thus, the invention increases the ability to reduce the percentage of TPH from the waste effluent in order to meet the newer, more rigorous purification requirements.

One of the major advantages of the invention is that the treatment method can be performed as a continuous process, thereby eliminating the need for large holding tanks and time-consuming holding and storage procedures for effluents. Additionally, harmful and expensive foaming and frothing agents are not employed in this process.

SUMMARY OF THE INVENTION

In accordance with the present invention, there is provided a system for treating commercial, industrial and institutional effluents to remove contaminants such as fats, oils and greases (FOGs) from wastewater, and to reduce the total petroleum hydrocarbons (TPHs) therein. The system generally features a continuous processing treatment of the effluent; however, it can also be adapted on a small scale for a batch procedure.

The FOGs in the wastewater are initially emulsified during a laundering or cleaning process by an alkaline detergent. The system comprises the feeding of this emulsified waste stream to a first screening station disposed along a wastewater effluent feed path. The solid matter and large particulates are removed at the first screening station. The screened, alkaline, emulsified waste stream is then fed to a first stage of a pH adjustment station. Here, the emulsified FOGs begin the process of release and coalescence within the fluid, through the downward adjustment of the pH, i.e., by treating the effluent with acid. Specifically, the acidification of the effluent and the coalescence of the FOGs are achieved in a two-stage process. At a certain acid pH level (usually achieved during a second pH-adjusting stage downstream from said first pH adjustment stage), the alkaline emulsion will be caused to break up and begin coalescing. This causes the release and the beginning of the agglomeration of the FOGs. An organic, cationic polymer is also added after the process' second pH adjustment stage, in order to agglomerate and/or coagulate the FOGs. The stream is also fed to a second screening station, where fine particulates are removed, leaving the stream free of particles greater than approximately twenty to fifty microns. Additional filtering can be used after this stage to reduce the particulates to about twenty microns. An air sparger or bubbler which introduces air or gas into the water to aid in the agglomeration of the FOGs may be used at this point. Finally, the dispersed emulsion stream is introduced into a separation station comprising either a separator, coalescer, clarifier or combination thereof. In the separation station, the fats, oils and grease (and any remaining solid waste) are separated from the aqueous phase, siphoned off and/or pumped away. The wastewater is now in a condition so as to be able to be discharged into the sewer system.

Other processing can subsequently be done, such as environmental pH adjustments or the removal of other contaminants (such as heavy metals). The addition of the organic, cationic polymer enhances the final separating or coalescing of the FOGs from the waste effluent and, hence, provides a further reduction in the total petroleum hydrocarbons (TPHs) in the waste effluent. The organic, cationic polymer is selected from a group consisting of: poly(ethyleneamine), poly(2-hydroxypropyl-1-N-methylammonium chloride), poly(2-hydroxypropyl-1,1-N-dimethyl-ammonium chloride), poly[N-(dimethylaminomethyl)-acrylamide], poly(2-vinylimidazolinum bisulfate), poly(diallyldimethylammonium chloride), poly(N,N-dimethylaminoethyl methacrylate) which is either neutralized or quaternized, polyacrylamide, poly[N-(dimethylaminopropyl)-methacrylamide], poly(sodium or ammonium acrylate), poly(sodium styrenesulfonate), poly(ethylene oxide), poly(vinylpyrrolidinone) and mixtures thereof. The preferred organic polymers of this selected group are: poly(2-hydroxypropyl-1-N-methylammonium chloride), poly(2-hydroxypropyl-1,1-N-dimethyl-ammonium chloride), poly[N-(dimethylaminomethyl)-acrylamide], poly(2-vinylimidazolinum bisulfate), poly(diallyldimethylammonium chloride), and poly(N,N-dimethylaminoethyl methacrylate).

Other organic substances can be used to assist the agglomeration, such as anionic starches, guar gum, protein colloids, alginic acid and chitosan.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements will bear the same designations throughout the figures.

DESCRIPTION OF THE PREFERRED EMBODIMENT

Generally speaking, the invention pertains to the purification of commercial, industrial and institutional waste streams in order to bring them into dischargeable compliance with environmental standards. The invention provides a system for removing contaminants, such as FOGs and TPHs, from waste effluents on an essentially continuous basis. During the treatment process, the FOGs and TPHs disposed within the textiles to be cleaned are treated with an alkaline detergent, causing their emulsification. The effluent waste stream is then treated by removing the solids and particulates. The alkaline emulsion is broken up by the acidification of the wastewater, thereby releasing the FOGs and TPHs. The FOGs and TPHs dispersed or dissolved in the water are agglomerated by the introduction of an organic, cationic polymer. The waste stream is then fed to a separation station, where the oils are adsorbed on an appropriate surface, such as a plate or lipophilic media pack. The oil molecules form droplets that rise to the surface and are siphoned off and/or pumped away. The wastewater is then dischargeable to the Public Owned Treatment Works (POTW) after a final pH adjustment which conforms the waste effluent to appropriate levels dictated by environmental regulations.

The subsequent description will be directed toward the purification of laundry effluents for the sake of preferred description. It should be understood, however, that the invention can be used for a wide variety of wastewater management problems. The invention will also be described as a continuous process, to which it is best suited. However, the system can be adapted for batch processing, as is most practical in small cleaning establishments.

Figure 1:
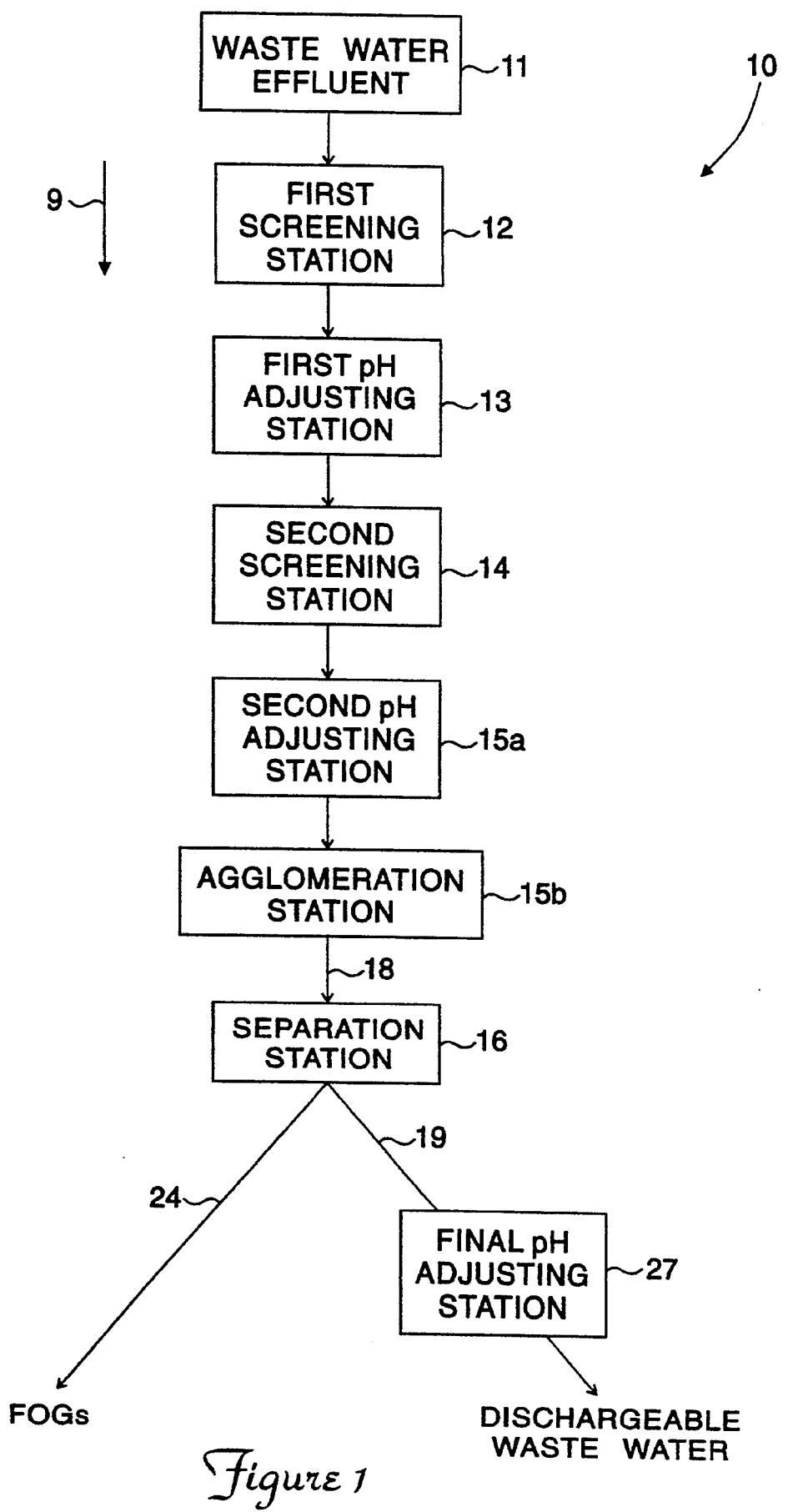
FIG. 1 represents a block flow diagram of the treatment facility utilized to decontaminate commercial waste streams in accordance with this invention.

Now referring to FIG. 1, a block flow diagram of the purification system 10 of this invention is illustrated, wherein various treatment stations are shown disposed along a wastewater effluent feed path 9. Wastewater effluent 11 is fed to a first screening station 12; this effluent contains FOGs that have been emulsified with at least one alkaline (ethoxylated amine) of the type disclosed in U.S. Pat. No. 3,117,999, issued Jan. 14, 1964, or disclosed in co-pending U.S. patent application Ser. No. 07/718,730, filed Jun. 21, 1991, now U.S. Pat. No., issued.

The first screening station 12 comprises a set of coarse mesh filters that are designed to remove balls of lint and any large foreign objects such as pencils, nuts, bolts, paper clips, etc., which may have been inadvertently left within any of the washed textiles. After the effluent has been filtered in screening station 12, it is fed to a first pH adjustment station 13. The pH adjustment station 13 comprises a metering pump for introducing acid into the effluent so as to adjust the pH downward. The pH adjustment station 13 will also comprise a pH sensor connected to a controller for controlling the metering pump, as well as a fluid control sensor and valve for controlling the amount of liquid passing through the system. An agitator may also be utilized at station 13 for mixing the acid into the effluent.

After the effluent pH has been reduced, the alkaline emulsion containing the FOGs will begin to break up, thus releasing and dispersing the FOGs into the fluid. The breaking up of the emulsion will be completed within the second pH adjustment station 15a, where the pH will be reduced to a preferred range of approximately 1.5 to 5.5.

After the effluent has been treated in the first pH adjustment station 13, it is pumped to a second screening station 14. The second screening station 14 comprises a mechanically vibrated screen or screens, such as a multi-tiered shaker screen manufactured by Sweco or Midwest Industries. The shaker has fine mesh filtering screens in the size range of approximately 20 to 325 mesh. The size and number of filtering screens are dependent upon the laundering process and the nature of the textiles being cleaned. For a standard industrial laundry, three screens ranging in size from approximately 60 to 200 mesh are adequate.

The fine screening is important because fine particulates are removed. It is possible to remove particles down to approximately twenty to fifty microns in size during this phase of the process, and down to approximately twenty microns with the aid of additional filtering disposed after station 15a.

After the small particles have been removed, the second pH adjustment is accomplished at station 15a, as aforementioned. Station 15a comprises the same components as does the first pH adjustment station 13.

The fluid passing through the various pH adjustment stations 13 and 15a, respectively, may be contained within differently-sized tanks to accommodate the amount of flow through the system. Any suitable holding vessel that will not deteriorate from the introduction of alkaline and acid reagents can serve as a tank. The holding vessels can comprise a concrete pit, stainless steel tank, an FRP-lined tank, etc.

The broken-up emulsion of station 15a is then treated with an organic, cationic polymer at coagulation station 15b. The organic, cationic polymer acts as an agglomerating and/or coagulating agent for the split FOGs. The use of this organic, cationic polymer provides a reduction of total petroleum hydrocarbons (TPHs) in the waste stream. The particularly high levels of TPH (in excess of 2,000 ppm) present in laundry effluent can be reduced to about 100 ppm with the coagulant.

The organic, cationic polymer can be any one of the following compounds: poly(ethyleneamine), poly(2-hydroxypropyl-1-N-methylammonium chloride), poly(2-hydroxypropyl-1,1-N-dimethyl-ammonium chloride), poly[N-(dimethylaminomethyl)-acrylamide], poly(2-vinylimidazolinum bisulfate), poly(diallyldimethylammonium chloride), poly(N,N-dimethylaminoethyl methacrylate) which is either neutralized or quaternized, polyacrylamide, poly[N-(dimethylaminopropyl)-methacrylamide], poly(sodium or ammonium acrylate), poly(sodium styrenesulfonate), poly(ethylene oxide), poly(vinylpyrrolidinone) and mixtures thereof.

The preferred organic polymers of this selected group are: poly(2-hydroxypropyl-1-N-methylammonium chloride), poly(2-hydroxypropyl-1,1-N-dimethyl-ammonium chloride), poly[N-(dimethylaminomethyl)-acrylamide], poly(2-vinylimidazolinum bisulfate), poly(diallyldimethylammonium chloride) and poly(N,N-dimethylaminoethyl methacrylate).

Other organic substances can be used to assist the agglomeration, such as anionic starches, guar gum, protein colloids, alginic acid and chitosan.

Figure 2:
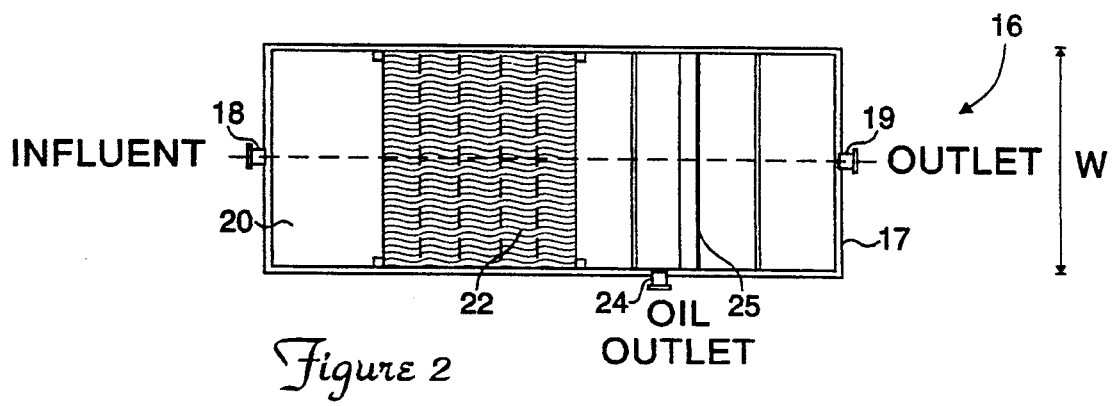
FIG. 2 is a top view of a coalescing apparatus disposed within the separation station, as illustrated in FIG. 1.
Figure 3:
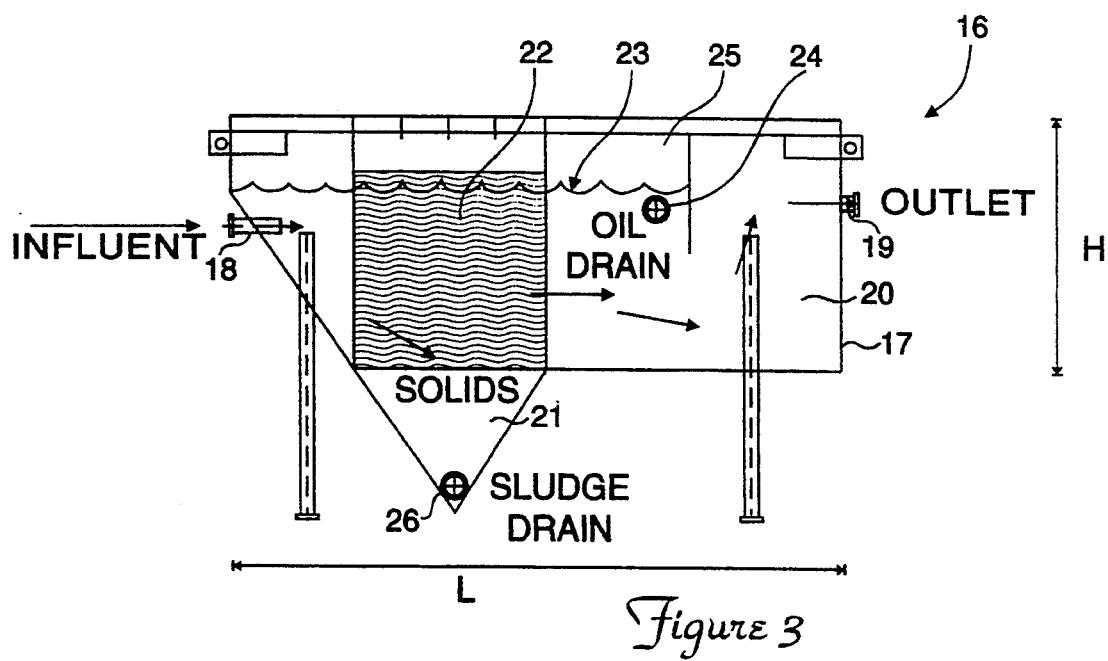
FIG. 3 is a front view of the coalescing apparatus shown in FIG. 2.

The waste effluent containing the agglomerated FOGs and TPHs is then transferred to a separation station 16. An air sparger or gaseous bubbler may be introduced between stations 15b and 16, respectively, in order to aid in the agglomeration of the FOGs and TPHs. An additional particle filter can also be utilized at this stage of the process to reduce the size of the particulates to about 20 microns. The flow into station 16 is controlled; once inside station 16, the flow is laminar. The separation station 16 comprises either a separator, coalescer, clarifier or combination thereof. At this station, the FOGs and the TPHs are physically separated from the aqueous liquid. In the preferred embodiment, the invention utilizes a coalescer 17, Model No. 8201S, manufactured by Alcoa or Diamond Chemical, as illustrated in FIGS. 2 and 3. The coalescer 17 comprises an inlet 18, an outlet 19 and a holding tank 20 having a V-shaped mid-section 21. The effluent from station 15 is fed into the inlet 18 of the coalescer 17, where it enters holding tank 20. Above the V-shaped mid-section 21 of the holding tank 20 is disposed a coalescing pack 22. The effluent entering through inlet 18 is directed to the coalescing pack 22, where the FOGs adsorb onto the adsorbing pack surface. The coalescing pack 22 can comprise a convoluted sheet of polyvinylchloride material or polypropylene. As the molecules of fat, grease and oil adsorb onto the surface of screen 22, they coalesce and form droplets that quickly rise to the top of the liquid surface 23. The FOGs floating upon surface 23 are then siphoned off through the oil drain 24. The oil drain 24 can comprise a pump (not shown) for rapidly discharging the FOGs, if so required. The remaining aqueous fluid is forced under baffle 25 and out the outlet drain 19.

Any sludge or dirt still remaining in the effluent entering the inlet 18 of tank 20 is quickly eliminated during the adsorption of the FOGs and TPHs upon the coalescing pack 22; it then settles to the bottom of the V-shaped mid-section 21. The settled sludge is siphoned off through the sludge drain 26 disposed at the bottom of the V-shaped mid-section 21 of tank 20.

The FOGs and TPHs leaving through oil drain 24 comprise as little as 1.7% water and are suitable as burnable fuel.

The wastewater leaving through outlet 19 contains less than 100 parts per million of FOGs and less than 100 parts per million TPHs. The water leaving the tank 20 through outlet 19 can be passed to a final pH adjustment station 27 (FIG. 1), to bring the effluent into environmental regulation conformity, after which it becomes dischargeable wastewater.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the current invention, what is desired to be protected by Letters Patent is presented by the subsequently appended claims.

What is claimed is:

1. An effluent purification system for removing fats, oils and grease (FOGs) from laundry-type wastewater effluent, and for reducing total petroleum hydrocarbons (TPHs) in said wastewater, said wastewater having been treated with an emulsifying detergent, so that said wastewater effluent can be discharged, said effluent purification system comprising:

means defining a wastewater effluent feed path containing an introduced wastewater effluent from a source of wastewater treated with an amine based emulsifying detergent to be purified;

at least one screening station disposed along said wastewater effluent feed path for removing solid materials from said wastewater effluent;

at least one pH adjusting station disposed adjacent said screening station and along said wastewater effluent feed path for adjusting the pH of the wastewater effluent and initiating release and dispersion of emulsified FOGs from said wastewater effluent;

an agglomeration station disposed along said wastewater effluent feed path after said pH adjustment station and before a separation station, for introducing a polymer to said wastewater effluent for agglomerating dispersed FOGs and for enhancing the removal of TPHs from the wastewater effluent; and a separation station disposed along said wastewater effluent feed path downstream of said pH adjusting station for separating said released and dispersed FOGs from an aqueous phase of said wastewater effluent, whereby said wastewater effluent will be made more purified for discharge.

2. The purification system of claim 1, wherein there are at least two pH adjusting stations disposed along said wastewater effluent feed path, upstream of said separation station.

3. The purification system of claim 1, wherein there are at least two screening stations disposed along said wastewater effluent feed path upstream of said separation station.

4. The purification system of claim 1, wherein said separation station includes a coalescer for separating said FOGs and TPHs from said aqueous phase of said wastewater effluent.

5. The purification system of claim 4, wherein said coalescer comprises means defining a lipophilic surface upon which said FOGs and TPHs are adsorbed.

6. The purification system of claim 1, further comprising means for introducing said wastewater effluent to said separation station and providing laminar flow of said wastewater effluent inside said separation station.

7. The purification system of claim 1, further comprising a final pH adjustment station disposed downstream of said separation station, said final pH adjustment station receiving purified wastewater effluent from said separation station and adjusting its pH to conform to environmental regulation standards.

8. The purification system of claim 1, further comprising filtering means disposed along said feed path adjacent a screening station for removing fine particles from said wastewater effluent.

9. The purification system of claim 1, further comprising gaseous means adjacent said pH adjustment station along said feed path for introducing gaseous bubbles into said waste stream effluent, and for aiding the FOGs in agglomeration.

10. The purification system of claim 1, wherein said agglomeration station comprises means for introducing an organic, cationic polymer into said waste stream effluent, for aiding the FOGs in agglomeration and for enhancing the removal of TPHs.

11. A continuous effluent purification system for removing fats, oils and grease (FOGs) from wastewater effluent that has been treated with an emulsifying, pH- or acid-sensitive detergent, and for reducing TPH in said wastewater effluent, so that said wastewater effluent can be discharged, said continuous effluent purification system comprising:

means defining a wastewater effluent feed path containing an introduced wastewater effluent from a source of wastewater treated with an amine based emulsifying detergent to be purified;

a first screening station disposed along said wastewater effluent feed path for removing solid, coarse materials from said wastewater effluent;

a first pH adjusting station disposed along said wastewater effluent feed path downstream of said first screening station for adjusting the pH of the wastewater effluent and for initiating the release and dispersion of emulsified FOGs from said wastewater effluent;

a second screening station disposed along said wastewater effluent feed path downstream of said first pH adjusting station for removing solid, fine materials from said wastewater effluent;

a second pH adjusting station disposed along said wastewater effluent feed path downstream of said second screening station for adjusting the pH of the wastewater effluent and for completing the release and dispersion of emulsified FOGs from said wastewater effluent;

an agglomeration station disposed along said wastewater effluent feed path after said second pH adjustment station and before a separation station, for introducing a polymer to said wastewater effluent for agglomerating dispersed FOGs and for enhancing the removal of TPHs from the wastewater effluent; and a separation station disposed along said wastewater effluent feed path downstream of said second pH adjusting station for separating said released and dispersed FOGs from an aqueous phase of said wastewater effluent, whereby said wastewater effluent will be made more purified for discharge.

12. The purification system of claim 11, wherein said separation station includes a coalescer for separating said FOGs from said aqueous phase of said wastewater effluent.

13. The purification system of claim 12, further comprising means for introducing said wastewater effluent to said separation station and providing laminar flow of said wastewater effluent inside said separation station.

14. The purification system of claim 11, wherein said coalescer comprises means defining a lipophilic surface upon which said FOGs are adsorbed.

15. The purification system of claim 11, further comprising a final pH adjustment station disposed downstream of said separation station, said final pH adjustment station receiving purified wastewater effluent from said separation station and adjusting its pH to conform to environmental regulation standards.

16. The purification system of claim 11, further comprising filtering means disposed along said feed path adjacent said second screening station for removing fine particles.

17. The purification system of claim 11, further comprising gaseous means for introducing gaseous bubbles into said waste stream effluent, said gaseous means disposed along said feed path between said second pH adjusting station and said separation station for aiding the FOGs in agglomeration.

18. The purification system of claim 11, wherein said agglomeration station comprises means for introducing an organic, cationic polymer into said waste stream effluent.

19. A method of purifying alkaline wastewater effluent containing fats, oils and grease (FOGs), and total petroleum hydrocarbons (TPHs), said wastewater effluent having been treated with an amine based emulsifying, pH- or acid-sensitive detergent, said method purifying said wastewater effluent for the purpose of discharging said wastewater effluent, said method comprising:
   a) removing solid materials from wastewater effluent;
   b) acidifying the wastewater effluent to initiate the release and dispersion of emulsified FOGs from said wastewater effluent;
   c) agglomerating dispersed FOGs and TPHs by addition of a polymer to said wastewater; and
   d) separating said released and dispersed FOGs and TPHs from an aqueous phase of said waste water effluent, whereby said wastewater effluent will be made more purified for discharge into the environment.

20. The method of claim 19, wherein said separating step (c) further comprises the step of:
   e) coalescing said FOGs and TPHs upon a lipophilic surface to physically separate said FOGs and TPHs from said aqueous phase of said wastewater effluent.

21. The method of claim 19, wherein said removing step (a) further comprises the step of:
   e) removing both coarse and fine materials from said wastewater effluent.

22. The method of claim 19, further comprising the step of:
   e) final adjusting of said pH of said wastewater effluent after said separating step (c), so that said wastewater effluent conforms to environmental regulation standards.

23. The method of claim 19, wherein said wastewater effluent is alkaline by reason of having been treated with an emulsifying, pH- or acid-sensitive alkaline detergent.

24. The method of claim 19, wherein said emulsified FOGs are released and dispersed in said pH adjusting step (b) by acidifying said wastewater effluent.

25. The method of claim 19, wherein step (c) further comprises the step of:
   e) introducing gaseous bubbles into said waste water effluent to provide agglomeration of said FOGs and TPHs.

26. The method of claim 19, wherein step (c) further comprises the step of:
   e) introducing an organic, cationic polymer into said wastewater effluent to provide agglomeration of said FOGs and TPHs.

27. The method of claim 19, further comprising the step of:
   e) filtering particles from said wastewater effluent prior to the separating step (c).

28. A method of purifying laundry-type, wastewater effluent containing fats, oils and grease (FOGs), and total petroleum hydrocarbons (TPHs), said wastewater effluent having been treated with an amine-based emulsifying detergent, said method purifying said wastewater effluent for the purpose of discharging said wastewater effluent, said method comprising:
   a) removing solid materials from wastewater effluent;
   b) acidifying the wastewater effluent to initiate the release and dispersion of emulsified FOGs and TPHs therefrom;
   c) agglomerating dispersed FOGs and TPHs by the addition of a polymer to said wastewater effluent; and
   d) coalescing said released and dispersed FOGs and TPHs, thereby separating them from an aqueous phase of said wastewater effluent, whereby said wastewater effluent will be made more purified for discharge into the environment.

* * * * *